Oct. 12, 1943.    R. A. ZOBEL    2,331,756
AUTOMATIC BALANCING DEVICE
Filed July 27, 1942

INVENTOR
ROBERT A. ZOBEL
BY
Wheeler, Wheeler & Wheeler
ATTORNEYS.

Patented Oct. 12, 1943

2,331,756

UNITED STATES PATENT OFFICE 2,331,756

AUTOMATIC BALANCING DEVICE

Robert A. Zobel, Milwaukee, Wis.

Application July 27, 1942, Serial No. 452,464

5 Claims. (Cl. 74—573)

My invention relates to improvements in automatic balancing devices.

The object of my invention is to provide means whereby revoluble members subject to permanent or temporary inherent unbalance may be automatically balanced.

More particularly stated, it is an object of my invention to provide an assembly of parts for a revoluble member whereby in the event of unbalance in the member an adjustment of weights automatically will occur and will place the entire revoluble member and the assembly in dynamic balance.

Another object of my invention is to provide in a device of the character described a "floating" guideway to assist in the distribution of movable weights and also to provide means whereby to encourage the movement of the weights to their proper locations.

In the drawing.

Like parts are designated by the same reference characters throughout the several views.

Figure 1:
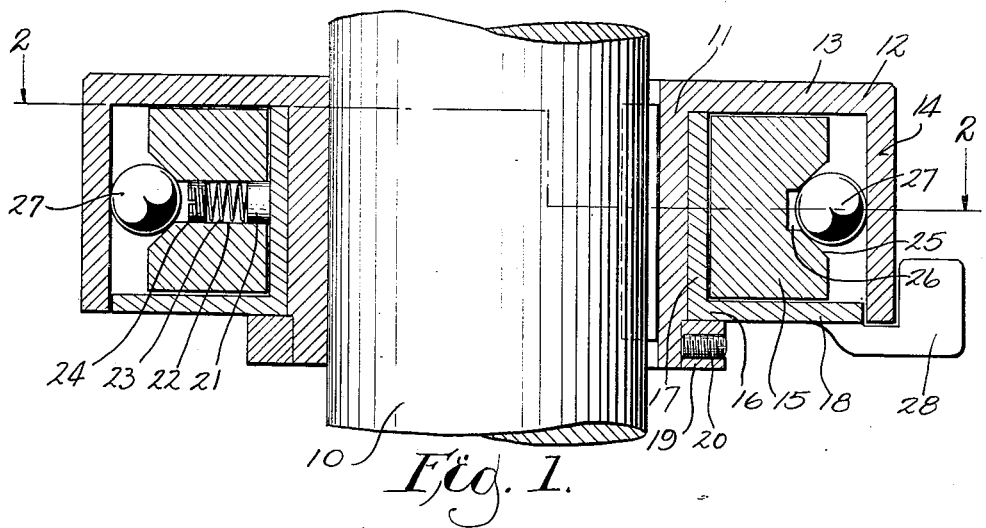
Figure 1 is an elevation of a portion of a revoluble member such as a shaft with my automatically balancing device mounted thereon, my automatic balancing device and its parts being shown in section radial of the revoluble member.

The drawing shows my automatic balancing device mounted upon a shaft 10 which may be a portion of a crank shaft, an arbor for grinding wheels or any other revoluble member constituting or forming a part of mechanism to be rapidly rotated whereby dynamic unbalance requires correction. It will be understood that while the shaft 10 is shown as a relatively small element, the size of the balls 27 in the drawing in ratio to the size of the shaft may differ with various types of equipment. Small balls and a relatively light annulus may be suited to certain species of equipment, whereas larger weights may be required where the problem of unbalance is different.

The larger structural elements in the assembly of parts forming my automatic balancing device include a hub 11 and a pulley-like L-shaped flange 12 forming a web 13 and retainer surface 14 comprising a part of a ball race. An annulus 15 forms an opposing guideway for a ball race, and an L-shaped lag-inducing unit 16 encloses the movable members.

Proceeding now to a more detailed explanation of the structure of my automatic balancing device, it will be seen that the lag-inducing unit 16, which is L-shaped in cross section, as seen most clearly in Fig. 1, has a hub 17 which has a running fit upon the exterior of hub 11, and lag-plate portion 18 is annular in shape so as to close the annular channel formed by the parts 11, 12, 13 and 14. The lag-inducing unit is held in place by ring 19 which is secured to the hub 11 by set screw 20. Within the space thus housed, the heavy annulus 15 is floated by means of a number of plungers 21 each with its own bore 22 and urged centrally radially by a spring 23 adjustably retained by threaded adjusting screw 24. Each of the springs 23 is given pressure as nearly identical with the pressure on other plunger springs as is possible within the range of manual adjustment of the screws 24 so that when the revoluble member 10 is at rest, annulus 15 is floated in spaced relation to hub 17 of the lag-inducing unit.

Peripherally the annulus 15 is grooved, as seen at 25, and channeled at 26 to provide one guideway for a race in which ball weights 27 are located. When the entire assembly is at rest and the annulus 15 is floated, as above indicated, the balls are free to move completely around the annulus, since the dimensions of the race formed by the annulus of the retainer surface 14 is then exactly suited to free running movement of the balls throughout the race.

Figure 2:
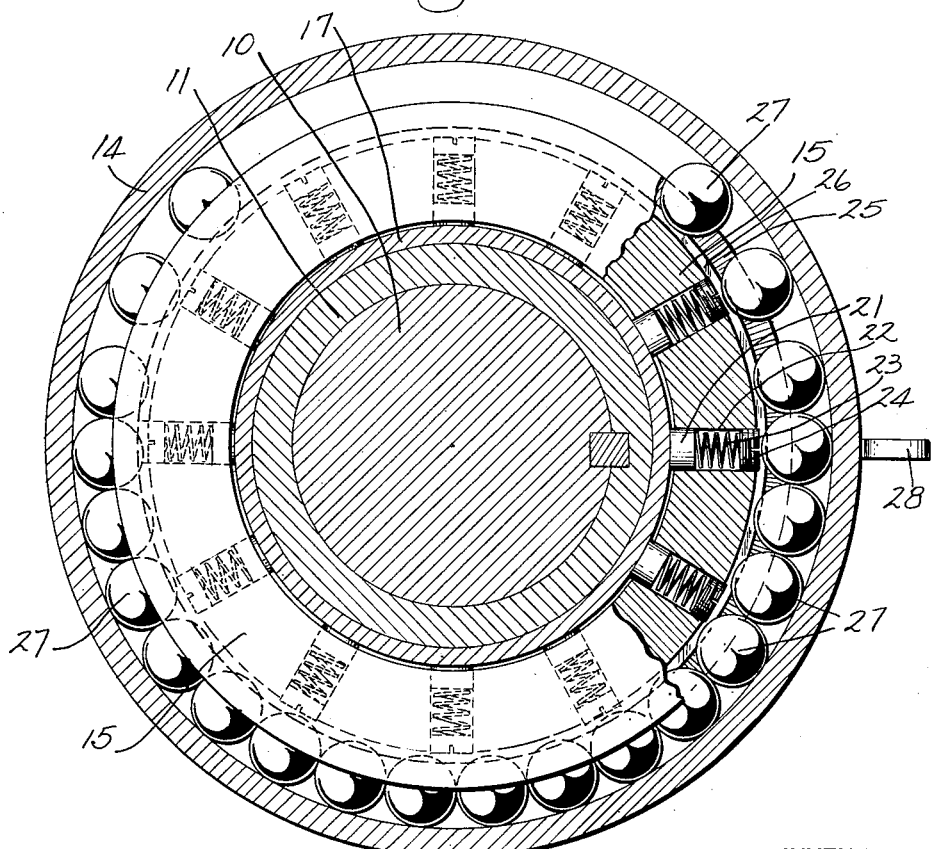
Figure 2 is a section on line 2—2 of Figure 1.

The number of balls or weights 27 in the race is approximately three-fourths of the number required to completely fill the race, as shown in Fig. 2. Therefore, however the weights 27 may be spaced at the time the revoluble member 10 and my assembly is caused to rapidly rotate, there will be a tendency, in the event of unbalance, for the heavy annulus 15 to be thrown outwardly despite the spring plungers 21—23, and the unbalance will accomplish a radial thrust in the direction in which the unbalance forces the annulus contrary to the urge of some of the springs and plungers. This restricts the dimensions of the raceway for some of the weights 27, and they will be forced to retreat from the restricted zone into that portion of the raceway which is relieved, or give additional free raceway space. The weights or balls are thus urged to a balancing position both centrifugally and by the "crowding" action induced by the movement of the annulus, as above described.

Because the movement of the parts as above described is a wedging or "crowding" movement which occurs during rapid rotation with accompanied induced friction of the parts, I have provided a lag fin 28 secured to lag plate 18, and the resistance of air or any other surrounding fluid upon fin 28 tends to cause the hub 17 to lag in its rotation with or upon hub 11. The resulting interaction assists by furnishing "relief" in the event that any binding or excessive friction occurs during the wedging or shifting of parts.

Thus, in the operation of my automatic balancing device, the floating annulus is held in concentric relation to its shaft 10 or rotor by the springs 23, and, if the shaft or rotor, or the mechanism with which my balancer is associated, is in exact balance and devoid of vibration, the annulus will not be in contact with any of the weights. If, however, the shaft or rotor is out of balance, it will vibrate, and the annulus will take up the vibration in such a way as to brush against the balls or weights. When this occurs, a rearrangement of the balls will occur so as to eliminate the vibration, and, when the vibration or unbalance has been corrected, the wedging or crowding movement referred to above will cease.

From the above description, it will be seen that I have not only provided an assembly of parts which automatically corrects chronic and inherent unbalance of a revoluble member, but I also have provided a device which automatically compensates for unbalance in the event that a temporary unbalance occurs. Even though the weights or balls 27 have taken a position to correct a previously existing unbalance, a new element of unbalance in a different dynamic location will cause the heavy annulus 15 to shift radially and force the weights 27 into new locations in the race whereby to correct dynamically for all unbalanced conditions. If because of extreme rotative speed stresses are considerable upon the various parts, the lag fin 28 will likewise provide extreme wind or fluid pressure to cause a lag in rotative movement of the parts 17 and 18. There will then be a tendency for movement of the plungers and of the annulus to cause the various parts to "creep" to their proper balancing positions.

I claim:

1. In a device of the character described, a revoluble race for movable balancing elements, said race being made up of a plurality of guideways one revoluble and slightly radially movable with respect to the other, balancing elements in said race of a number and size insufficient to fill the race and means for causing relative movement of said guideways.

2. In a device of the character described for a rapidly revoluble rotor to be balanced, a guideway movable with said rotor, a second guideway spaced from the first guideway and mounted for slight radial movement with reference thereto whereby to provide a race, balancing elements in said race and means connected with said second guideway to cause it to rotate at a rate different from that of the rotor.

3. In a device of the character described, a rotor having an annular channel the exterior surface whereof comprises a part of a race, an inner annular member in said channel to provide a complementary portion of said race movable slightly radially with respect to said channel, balancing members receivable in said race and a member attached to said complementary race member to force it to lag in the rotation of the rotor.

4. An automatic balancing device comprising an assembly for attachment to a revoluble member for rotation therewith, said assembly including an outer guideway for a race and an inner guideway opposite the outer guideway, movable weights in said race, an inner hub-like portion of the assembly opposite said inner guideway, and spring plungers between said hub-like member and the inner guideway whereby to float said inner guideway in spaced relation to said hub.

5. An automatic balancing device comprising an assembly for attachment to a revoluble member for rotation therewith, said assembly including an outer guideway for a race and an inner guideway opposite the outer guideway, movable weights in said race, an inner hub-like portion of the assembly opposite said inner guideway, and spring plungers between said hub-like member and the inner guideway whereby to float said inner guideway in spaced relation to said hub, said hub-like member having means for impeding rotation thereof.

ROBERT A. ZOBEL.